(12) United States Patent
Kantrowitz et al.

(10) Patent No.: US 6,618,697 B1
(45) Date of Patent: Sep. 9, 2003

(54) METHOD FOR RULE-BASED CORRECTION OF SPELLING AND GRAMMAR ERRORS

(75) Inventors: Mark Kantrowitz, Pittsburgh, PA (US); Shumeet Baluja, Waltham, MA (US)

(73) Assignee: Justsystem Corporation, Tokushima (JP)

( * ) Notice: Subject to any disclaimer, the term of this patent is extended or adjusted under 35 U.S.C. 154(b) by 0 days.

(21) Appl. No.: 09/312,229

(22) Filed: May 14, 1999

(51) Int. Cl.$^7$ ................................................. G06F 9/45
(52) U.S. Cl. ................................. 703/22; 703/2; 704/8; 704/9; 704/239; 704/240
(58) Field of Search ............................ 704/9, 10, 239, 704/240; 703/22, 2

(56) References Cited

U.S. PATENT DOCUMENTS

| | | | |
|---|---|---|---|
| 3,188,609 A | 6/1965 | Harmon et al. | 340/146.1 |
| 4,342,085 A | 7/1982 | Glickman et al. | 364/300 |
| 4,471,459 A | 9/1984 | Dickinson et al. | 364/900 |
| 4,650,349 A | 3/1987 | Westreich | 400/98 |
| 4,674,065 A | 6/1987 | Lange et al. | 364/900 |
| 4,701,851 A | 10/1987 | Bass et al. | 364/419 |
| 4,754,489 A | 6/1988 | Bokser | 382/40 |
| 4,775,251 A | 10/1988 | Suzuki et al. | 400/63 |
| 4,777,596 A | 10/1988 | Shaffer et al. | 364/300 |
| 4,818,131 A | 4/1989 | Sakai | 400/63 |
| 4,847,766 A | 7/1989 | McRae et al. | 364/419 |
| 4,868,750 A | 9/1989 | Kucera et al. | 364/419 |
| 4,915,546 A | 4/1990 | Kobayashi et al. | 400/697 |
| 5,060,154 A | 10/1991 | Duncan, IV. | 364/419 |
| 5,075,896 A | 12/1991 | Wilcox et al. | 382/39 |
| 5,148,367 A * | 9/1992 | Saito et al. | 434/167 |
| 5,189,610 A | 2/1993 | Kaplan et al. | 364/419 |
| 5,239,617 A | 8/1993 | Gardner et al. | 395/12 |
| 5,255,386 A | 10/1993 | Prager | 395/600 |
| 5,258,909 A * | 11/1993 | Damerau et al. | 704/9 |
| 5,467,425 A * | 11/1995 | Lau et al. | 704/240 |
| 5,475,587 A | 12/1995 | Anick et al. | 364/419.08 |
| 5,485,372 A | 1/1996 | Golding et al. | 364/419.08 |
| 5,521,816 A | 5/1996 | Roche et al. | 364/419.08 |
| 5,537,317 A * | 7/1996 | Schabes et al. | 704/9 |
| 5,559,693 A | 9/1996 | Anick et al. | 364/419.08 |
| 5,572,423 A | 11/1996 | Church | 395/795 |
| 5,604,897 A | 2/1997 | Travis | 395/795 |
| 5,640,487 A * | 6/1997 | Lau et al. | 704/240 |
| 5,659,771 A | 8/1997 | Golding | 395/795 |
| 5,715,469 A * | 2/1998 | Arning | 434/169 |
| 5,875,443 A | 2/1999 | Nielsen | 707/2 |
| 5,933,525 A * | 8/1999 | Makhoul et al. | 382/185 |
| 6,182,039 B1 * | 1/2001 | Rigazio et al. | 704/239 |
| 6,272,456 B1 * | 8/2001 | de Campos | 704/8 |
| 6,292,772 B1 * | 9/2001 | Kantrowitz | 382/230 |
| 6,424,983 B1 * | 7/2002 | Schabes et al. | 704/9 |

OTHER PUBLICATIONS

"Techniques for Automatically Correcting Words in Text" Karen Kurkich, Dec. 1992 vol. 24 No. 4, ACM 0360–0300/92/1200–0377.*

"Techniques for Automatically Correcting Words in Text" Karen Kurkich, Dec. 1992 vol. 24 No. 4, ACM 0360–0300/92/1200–0377.*

"One time Complete Indexing of Text: Theory and Practice" R.J. D'Amore, ACM 0–89791–159–8/85/006/0155, 1985.*

"Recursive Hashing Functions for n–grams" J. Cohen, ACM 1046–8188/97/0700–0291, 1997.*

* cited by examiner

Primary Examiner—Kevin J. Teska
Assistant Examiner—Fred Ferris
(74) Attorney, Agent, or Firm—Webb Ziesenheim Logsdon Orkin & Hanson, P.C.

(57) ABSTRACT

A computer implemented method which does not require a stored dictionary for correcting spelling errors in a sequence of words comprises storing a plurality of spelling rules defined as regular expressions for matching a potentially illegal n-gram which may comprise less than all letters in the word and for replacing an illegal n-gram with a legal n-gram to return a corrected word, submitting a word from said sequence of words to the spelling rules and replacing a word in the string of words with a corrected word.

21 Claims, 2 Drawing Sheets

Microfiche Appendix Included
(6 Microfiche, 493 Pages)

METHOD FOR RULE-BASED CORRECTION OF SPELLING AND GRAMMAR ERRORS

MICROFICHE APPENDIX

A microfiche appendix containing source code in the LISP language is filed herewith. It comprises 6 microfiche and 493 frames.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Although the availability of interactive spelling checkers is widespread, users do not like to use such systems because they are tedious. Interactive spelling checkers ask the user about any word that does not appear in the dictionary, even though most such words are valid. Such dictionary-based systems also do not detect valid word errors where the user accidentally substitutes one word for another. Even when the interactive systems do catch the errors (e.g., when the error yields a word that is not found in the dictionary), the first-guess accuracy is low, forcing the user to select the correct word from among a list of candidate alternatives. If the systems were to select the top-ranked candidate correction for automatic substitution, the low first-guess accuracy would mean that more than half of the automatic substitutions would be incorrect. Because of the extra effort involved and the tedious nature of the user interfaces, many users decide not to use interactive spelling checkers.

SUMMARY OF THE INVENTION

The present invention addresses these problems with known interactive spelling checkers. Since it has near-perfect first-guess accuracy, it can automatically correct errors as the user types without introducing new errors. It shifts the emphasis from recognizing valid words to recognizing errors. Identifying the nature of the error often allows correction of the error, even if there is no similar word in the valid word dictionary. Although there are existing systems based on dictionaries of common spelling errors and their associated corrections, these systems are limited to recognizing only the errors explicitly listed in the dictionary. The typical error dictionary contains about a thousand of the most common errors. The present invention presents a rule-based method for detecting and correcting spelling and grammar errors. The invention is not guaranteed to catch all errors, but those that it does correct are extremely likely to be genuine spelling and grammar errors. A variation of this invention for handwriting recognition and optical character recognition (OCR) improves the recognition accuracy of such systems.

A "regular expression" is a computer programming construct that comprises an n-gram template to be matched against a string of characters in a word. The n-gram template string may comprise less than all characters in the word. Matching the string either succeeds or fails. A matched pattern may cause addition, deletion, transposition and/or substitution of characters in the word. The n-gram template may comprise alternative characters, wild card characters and position indicators.

Briefly, according to one embodiment of this invention, there is provided a computer implemented method which does not require a stored dictionary of valid words for correcting spelling errors in a sequence of words. The method comprises the steps of storing a plurality of spelling rules defined as regular expressions for matching a potentially illegal n-gram which may comprise less than all letters in the word and for replacing an illegal n-gram with a legal n-gram to return a corrected word. A word from the sequence of words is submitted to the spelling rules. If a corrected word is returned, it is substituted for the misspelled word in the sequence of words. The method may comprise submitting a corrected word to at least one additional rule.

According to another embodiment of this invention, there is provided a method of correcting both spelling errors and grammar errors. The method comprises storing a plurality of spelling and grammar rules defined as regular expressions given the context of one or more adjacent words. At least two adjacent words at a time from the sequence of words are submitted to the rules. If a corrected word or sequence of corrected words is returned, it is substituted in the sequence of words.

Preferably, an exception list is associated with each regular expression or with the system as a whole to prevent n-gram replacement where the word matches an exception to the rule. Preferably, the spelling rules match potentially illegal n-grams comprising two or more characters. More preferably, the spelling rules recognize and correct complex types of errors in addition to simple insertions, deletions, substitutions and transpositions.

Applications of the methods disclosed herein include word processing programs that automatically correct errors as the user types, word processing programs with batch spelling correction, optical character reader programs and automatic handwriting recognition programs.

Most preferably, the methods according to this invention include storing spelling rules using multiple words in context to identify spelling errors, confusable words and common grammar errors to identify a unique correction from more than one possible correction or word boundary errors comprising missing spaces, inserted spaces, shifted spaces and combinations thereof.

According to a preferred embodiment, the stored rules include constraints based on case restrictions, parts of speech, capitalization and/or punctuation appearing within the sequence of words.

The methods according to this invention may also include a step for generating potential spelling rules defined as regular expressions comprising selecting as templates letters from errors in an error corpus and zero or more letters of context to identify a set of potential rules and the pruning from the set of potential rules those that are too general, too specific or do not identify the cause of the error. New rules may be generated based upon the user's manual corrections.

A further embodiment of this invention comprises a word completion method that is context sensitive comprising the steps of storing a plurality of word completion rules defined as regular expressions for matching an n-gram which may comprise less than all letters in the word and for replacing a matched n-gram with an n-gram to complete the word given the context of one or more preceding words. The previous word and n-gram comprising the initial letters of a word being typed are submitted to the rules. If a rule is fired, the word being typed is completed automatically.

The present invention goes beyond the state of the art by recognizing more than just isolated whole-word errors. It uses rules that recognize error patterns and their associated corrections. An error dictionary that contains only whole words can correct only as many errors as are listed in the dictionary. The rules used by the present invention can each correct numerous common errors without reference to a valid word dictionary. In essence, the present invention is not just recognizing the error, but also recognizing the cause of the error. This yields much more productive rules and, hence, a more powerful system.

The rules used by this invention are implemented by use of regular expressions, case-restriction flags, space deletion, insertion and shifting, and multiple words of context (including not just whole words and parts of speech, but also regular expressions). This allows the system to correct errors in a context-sensitive fashion, correct word-boundary errors and correct many valid word errors. The present invention can also correct many grammatical and lexical choice errors.

Regular expressions used by this invention include not just sequences of alphanumeric characters and start-word and end-word flags, but also more abstract patterns, such as left and right handedness of the letters, sets of letters, and the letter that corresponds to toggling another letter's shift bit. The regular expressions are not limited to just the letters involved in the error, but can optionally include multiple letters of context on either or both sides of the error. The regular expressions are constructed to contain just enough context to uniquely identify the nature of the error and hence the corresponding correction. This means that the rules generalize beyond the specific examples that motivated the rule, but are not so general as to introduce new errors into correctly spelled text. It also means that the rules are not limited to single insertions, substitutions, deletions and transpositions, but can also handle other types of errors. It can handle transpositions of letters around one or more letters, such as the transposition of consonants around one or more vowels or the transposition of vowels around one or more consonants. The regular expressions are not limited to bigrams or trigrams, but can be n-grams of any length. The determining factor is the length needed to uniquely identify the correction, not blind selection of all n-grams of a specific length.

The rules used by this invention are bidirectional. Normally, the only use for bidirectional rules would be to randomly introduce natural-seeming errors into correct text. However, the bidirectional rules are useful for "correcting" between British English and American English without requiring a separate set of rules for each direction. If the user specifies that he/she is writing British English, the system simply runs the rules that correct British English to American English in reverse.

Rule-chaining allows multiple errors to be corrected by multiple rules, as well as more complex spelling conventions to be represented by several rules.

The combination of multiple constraints improves the quality of the system. For example, f/v replacement would normally replace the word "knife" with the word "knives" when adding the suffix "s". But when "knife" is used as a verb, the word "knifes" is acceptable. Thus, whether the rule identifying "ifes" as an error should apply depends on the imputed part of speech of the affected word.

The rules used by this invention may include lists of exceptions which may themselves be regular expressions in addition to whole words. This often yields a significant reduction in the number of rules. It also makes it easier for the user to override the operation of the system for particular words.

In the following examples of rules, the $ character signifies end of word and the ^ character signifies start of word. Any exceptions are listed after the rule in parentheses, delimited by commas. Square brackets indicate that any of the enclosed characters can appear in the given position, conflating what would otherwise be several rules.

mnet$→ment
fuly$→fully
^ht→th (html, http)
ierd→eird
eif$→ief
the another→the other
corect→correct
its a→it's a
^a$ ^[aeio]→an (^a$, ^one$, ^one-)
away form→away from
at there→at their
of of→of
their seem→there seem Note that the "mnet" rule is restricted to words whose last four letters are "mnet", whereas the "lierd" rule can include words in which "ierd" appears in the middle, such as "wierdly". Even the rule involving the misspelled word "corect" is general because it not only covers the pair mapping corect to correct, but also the rule will match and correct many more spelling errors, such as "corectly", "corected", "corection" and so on. If one wanted to restrict this rule to matching only whole words, one would specify the constraint as "^corect$". Also note the "of of" rule, which corrects a common example of repeated words. Other spelling checkers flag any example of repeated words, even though "nine one one" is not an error. The purpose of these rules is to only include errors that are certain to be incorrect, not flag all possible errors.

The present invention does not correct all errors since some errors do not unambiguously specify their correction, even given context information. In such cases, rules may generate multiple candidate substitutions and allow the user to choose from among the candidate corrections. In any event, the present invention can be used in combination with traditional interactive spelling correction systems. One way is in parallel. The other way is where the correction proposed by the present invention is listed first in the set of candidate corrections proposed by the interactive correction system. If the user should choose not to use the interactive spelling correction system, the automatic spelling correction system will at least have improved the quality of their writing somewhat. Given the realities of user boredom and the tedious nature of batch spelling correction systems, automatic spelling correction will improve spelling accuracy.

According to another embodiment, the present error correction method can learn from the user's own corrections. When the system detects the use of deletion or transposition or insertion followed by or preceded by cursor movement, it records the word before the correction as well as the result of the user's correction. In cases of multiple insertions, deletions and transpositions, it waits until cursor movement moves outside the word to initiate learning. If the error resulted from the action of the automatic correction system (i.e., the user undid the effects of the automatic correction), the system adds the word to an exception list for the rules that generated the error. When the exception list for a rule grows too large, it triggers the rule induction system to refine the rule. If the user did not undo a correction, the system applies the rule induction system to generate a new rule to address the error and similar errors in the future. Thus, the system can adapt to the user's own typing habits.

According to yet another embodiment, the present method may also learn from the user's behavior in using the interactive correction system. If the user made the same error multiple times and always chose the same correction for the error, the system may be configured to ask the user whether it can add the error-correction pair to the automatic correction system. If the user agrees, this will trigger the rule induction system.

A key to the effectiveness of the present invention is how the rules are produced. A large collection of spelling and typing errors made by real people in a natural setting has been gathered. The initial set of rules were then written by hand, often inspired by specific examples from the error corpus. The rules were tested in various ways before being added to the code. For example, a rule was run on an 80,000 word dictionary to verify that it does not introduce errors into valid words. If there are any exceptions, they must be added to the rule or the rule discarded.

New rules, however, may be generated automatically by one of two methods. The first method tries to find the rule that maximally matches the error corpus while minimizing the number of exceptions. The second method is somewhat more cautious in the generalizations it accepts, requiring rules to be statistically representative of the error corpus from a generative perspective. This means that applying the inverse of the rule to the dictionary should yield spelling errors with a similar distribution to that of the corpus. For example, the first method generated the rule atii→ati to account for errors like "inspiratiion" and "generatiive". All of the errors in the error corpus that match "atii" end in "ation" or "ative". Applying the inverse of this rule to the dictionary, however, one finds that only half of the errors generated by the inverse rule end in "ation" or "ative". This suggests that although the rule matches all of the errors, it generalizes beyond the cause of the spelling error. One needs to add additional context characters to the rule in order to limit it to just the cases that reflect the nature of the error. Caution is needed in developing rules for an automatic correction system because no dictionary can be complete. For example, most dictionaries do not include personal and family names. The present invention is able to correct spelling errors in names without introducing any new errors. It is desired to minimize the likelihood of a rule causing an error while still maximizing the number of errors it can correct. In an interactive correction system where one wants to identify possible errors without 100% first-guess accuracy, the first of the two systems is to be preferred because of the greater generality of the rules it generates.

In the first rule-design method, each error from the error corpus generates many potential rules by including zero or more characters on either side of the point of the error. Each time a character is added on the left-hand side of the rule, the corresponding character is added to the right-hand side of the rule. For the purpose of rule generation, rules are thought of as simply a multiple-character substitution pair. This encompasses all major types of spelling errors, including insertions, deletions, transpositions, transpositions around a character and, of course, substitutions. For example, the transposition "ie" becoming "ei" after "c" can be represented as the multiple-character substitution "cie"→"cei". Similarly, the deletion of "e" in "geing" can be represented as the multiple-character substitution "geing"→"ging". Rules can have wildcards, negation and disjunction, but this is not handled in the initial rule-generation phase.

Since different errors may generalize to the same sets of rules, duplicate rules are eliminated. Rules are also eliminated according to several heuristics. The number of times the left-hand side of the rule matches errors in the error corpus is examined. If more of the matches would fail to correct the error than successfully correct the error, the rule is discarded. This heuristic is equivalent to requiring the ratio of successful to unsuccessful firings in the error corpus to be greater than 1, or that the unsuccessful firings represent no more than 50% of the total matches in the error corpus. This latter figure is a tunable parameter. In some sense, it reflects the precision of the rule in correcting errors correctly.

The left-hand and right-hand sides of the rule are compared with a large dictionary. If the left-hand side appears more frequently than the right-hand side, the rule is discarded. This would mean that the rule has more exceptions than potential corrections and hence is not a very productive rule.

If the number of times the rule successfully matches and corrects an error in the error corpus is too low, the rule is discarded. The goal of this heuristic is to have rules that successfully account for as much of the error corpus as possible (i.e., maximize the rule's coverage of the corpus). Given that the corpus represents a sample of the distribution of errors in real life, rules that match more of the corpus will fire more frequently. This effectively minimizes the number of rules required to correct as many errors as possible. It also maximizes the likelihood that the rules reflect general types of errors, instead of just memorizing the specific errors found in the error corpus.

If the number of times the right-hand side of the rule matches words in the dictionary is too low, the rule is discarded. The goal of this heuristic is to have rules that can potentially correct a very large number of possible errors. After all, if a rule can correct only one potential error, it would be better to list that error explicitly than to use a rule.

If the number of times the rule matches the errors in the corpus but fails to successfully correct the error is too large, the rule is discarded. The goal of this heuristic is to obtain rules that pinpoint the nature of the error precisely. Failing to correct errors successfully is an indication of a poor quality rule. A rule that makes many mistakes will require not just exceptions that correspond to words in the dictionary, but also exceptions that correspond to errors. The number of such exceptions should be minimized to reduce the complexity of the rules.

If the number of times the left-hand side of the rule matches words in the dictionary is too high, the rule is discarded. The goal of this heuristic is to minimize the likelihood that the rule will introduce errors into words that are correct. Such words must be included in an exception list for the rule, and such exception lists must be kept short. If the exception list is too long, it is an indication of a poor quality rule. This effectively minimizes the number of exceptions to the rules.

If the left-hand side of the rule matches the right-hand side of the rule, it is discarded. The reason for this heuristic is that such rules match the results of applying a correction, and so will not terminate if applied iteratively. Such a rule would have to include the right-hand side on its exception list. (This heuristic is redundant because such rules will fail the second heuristic listed above.)

If two rules correct the same collection of errors, the rule with the lower ratio of exceptions to right-hand side dictionary matches is preferred. The purpose of this heuristic is to eliminate rules that are too general.

It is important to limit the number of rules in applications where memory is at a premium, such as hand-held computers like the "Palm Pilot". The "Palm Pilot" has only 1 Mb of memory, so we had to limit the number of rules to fit in about 5%–6% of the memory. (A dictionary based spelling correction system would require 1 Mb just for the dictionary.)

After the rules are pruned, a fixed number "n" of the rules will be selected. The goal is to select the n-element subset of rules which maximizes the coverage of the rules (the number of error-correction pairs accounted for in the error corpus) while minimizing the number of exceptions. This is accomplished using stochastic search methods.

Another rule-design method comprises optimizing a different measure of rule collection quality, such as maximizing the dictionary coverage of the right-hand side of the rules while minimizing the number of exceptions or minimizing rule length, or maximizing the error corpus coverage of the left-hand side of the rule. Another rule-design method comprises using a greedy algorithm to incrementally add rules to the collection based on their incremental impact on collection quality. As errors are added to the error corpus, they are examined to determine what rules, if any, should be added to the rule collection. If a rule does not fail any of the pruning tests and increases the dictionary coverage of the collection without adding too many exceptions, it is added to the collection. In other words, if a new rule is of sufficient quality and does not overlap too much with the current rule collection, it is added to the collection. The shortest rules are most preferred.

The second rule design method is similar in design to the first method but adds a few more pruning rules. The number of times the right-hand side of the rule matches corrections in the error corpus is examined. The rule is inverted and applied to the correction to generate an error which is then compared with the actual error. If the ratio of the number of times the generated error matches the actual error to the number of times it does not is less than one, the rule is discarded. This is equivalent to requiring the rule to account for at least 50% of the corrections it matches in the corpus. This latter figure is a tunable parameter. In some sense it reflects the degree to which the rule is a generative explanation for the source of the error (i.e., a measure of the degree to which the error distribution in the error corpus reflects the action of the rule).

Rules are evaluated by comparing them with the result of adding a character of context to either side of the patterns. Three sets are formed. The first set contains all dictionary words that match the right-hand side of the rule. The second set contains all errors that match the left-hand side of the rule. A subset of the first set is obtained by examining which letters appear one character to the left of the left-hand side pattern in the words in the second set, and finding all elements of the first set that match the extended patterns. These elements are joined by the words in the first set that match the characters that appear one character to the right of the left-hand side pattern in the words in the second set. Together these words form the third set. If the ratio of the number of elements in the third set to the number of elements in the first set is less than 75%, the rule is discarded as being too general. In essence, this heuristic measures the generative coverage of the rule relative to the dictionary, requiring the distribution of errors in the error corpus to be close to the distribution that would be predicted by applying the inverse of the rule, at least in an aggregate sense. If there is a large (more than 25%) group of dictionary words whose corresponding errors do not have representatives in the error corpus, this suggests that the rule does not correctly account for the cause of the errors by generalizing the errors too much.

This method can also provide a deterministic procedure for generating a rule from an example error. One starts with the smallest possible rule and adds characters to the left and/or right of the pattern (e.g., via a dynamic programming algorithm) until the resulting rules are no longer discarded as unacceptable. This gives a "fringe" of possible rules that can be evaluated by the rule preferences described above.

DESCRIPTION OF THE PREFERRED EMBODIMENTS

Figure 1:
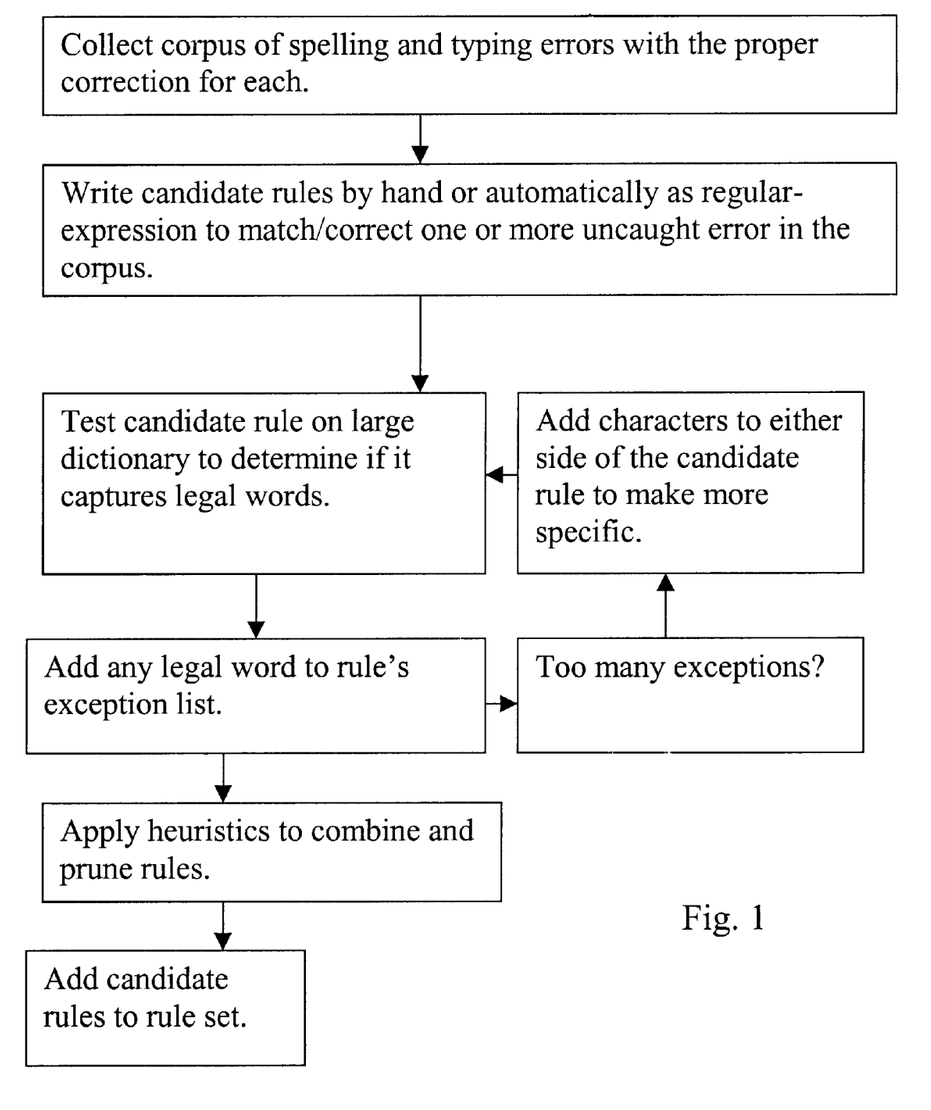
FIG. 1 is a diagram illustrating the generalized procedure for developing a set of regular expressions useful according to this invention.
Figure 2:
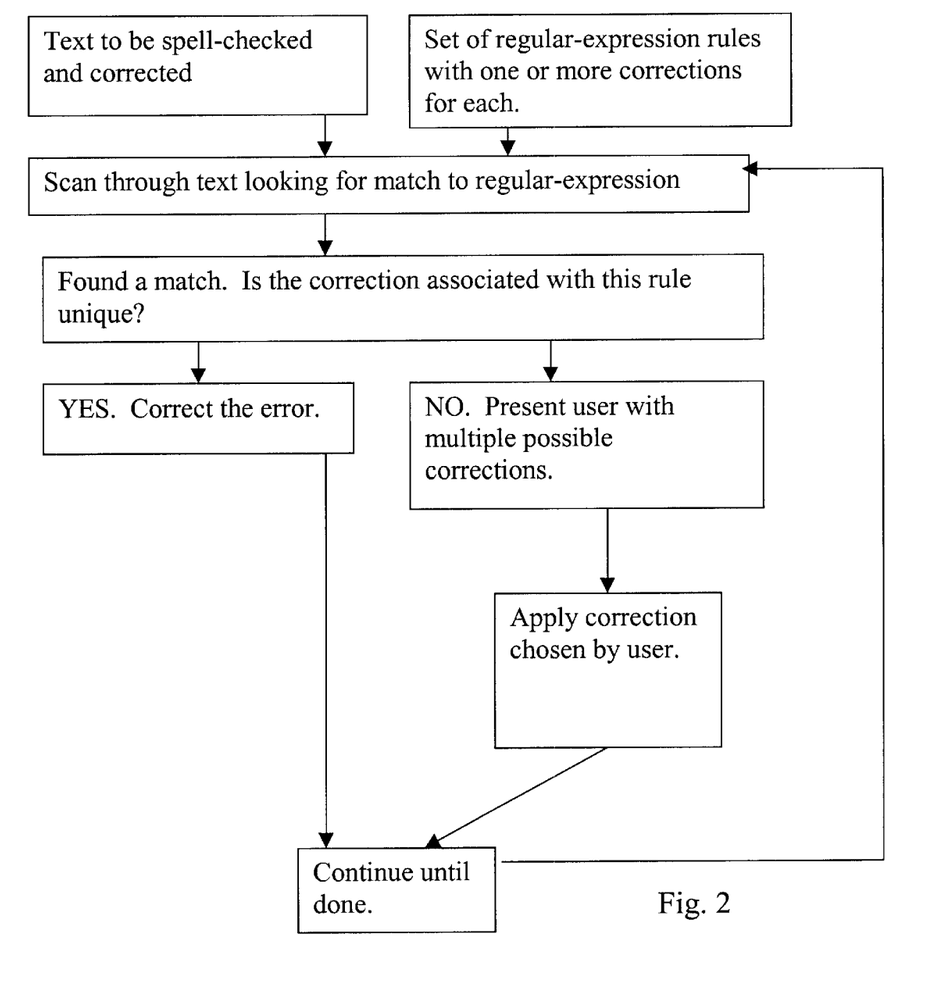
FIG. 2 is a diagram illustrating a generalized application of regular expression rules to correct text according to this invention.

The use of regular expressions to detect and unambiguously correct spelling and grammar errors with very high accuracy is not limited to just the letters involved in the error, but may include any number of letters of context on either or both sides of the error. Not only can this method recognize and correct the traditional types of errors (e.g., single insertion, deletion, substitution and transposition errors), but it can also recognize and correct more complex types of errors, such as long distance transpositions (e.g., transposition of two consonants around a vowel and two vowels around a consonant, as well as Spoonerisms) and cyclical letter shifts (e.g., movement of a letter forward or backward two or more positions, as in "bwackard"). The regular expressions may include n-grams of any length and are not restricted to n-grams of a specific length. Regular expressions may be used to recognize exceptions to spelling and grammar correction rules. Multiple words of context may be used to identify and automatically correct valid word spelling errors, confusable word errors, such as its/it's, and common grammar errors. The use of multiple words of context may be used to identify and automatically correct nonword spelling errors where the correction would normally be ambiguous. The use of additional context allows the system to restrict the possible corrections to a unique correction. The use of multiple words of context may also be used to identify and automatically correct word boundary errors, such as missing spaces, inserted spaces and shifted spaces. The rules may include other constraints, such as case restrictions, parts of speech restrictions (e.g., "knifes" is corrected to "knives" only when the word is a noun, not when the word is a verb) and restrictions on the types of punctuation which may appear between the words (e.g., sentence and phrase-final or not).

One method of generating regular expression rules for spelling correction uses the errors in an error corpus and one or more letters of context to generate potential rules and then uses a variety of heuristics to prune rules that are either too general (i.e., which include valid words within their scope), too specific (i.e., which do not include many similar errors within their scope) or which do not reflect the underlying cause of the error (i.e., which generalize the errors in a fashion which might lead the rules to introduce errors into novel words not present in the dictionary that was used to generate the rules).

The regular expressions may include not just specific letter patterns and word boundary identifiers (e.g., word start and word end), but more abstract patterns such as: the keys adjacent to the letter "s", the letters typed on the left hand, the letters in the middle two columns of the keyboard, the gemination consonants (letters than can be doubled) and the letter which results from toggling another letter's shift bit (e.g., the digit 9 appears on the same key as the left parenthesis).

The rules may be bidirectional. This allows the rules to be run in reverse. One application is the generation of error-filled text. Another application is correcting British English to American English and vice versa, without requiring a separate set of rules for each direction. Word completion can be thought of as a specialized application of spelling correction. Although there is considerable prior art for word completion, there is no prior art for context-sensitive word completion where one or more words of context can be used to identify the unique completion when the word fragment would otherwise be ambiguous if taken in isolation. Likewise, there is no prior art for phrase completion where a word fragment (or even whole word or words) is replaced with a phrase. Both of these applications are easily represented within the framework of this invention. The rules may be executed in parallel or serial order. The present invention allows for any number of rules to be executed, allowing multiple errors to be corrected in the same word, as well as allowing more complex errors to be decomposed into simpler rules.

Where there is not a unique correction, context is used to reduce the number of candidate corrections and/or the hard-coding of a list of candidate corrections for the most common spelling errors. The prior art generates a list of candidate corrections based on general methods that yield unlikely corrections in addition to the actual corrections. Hard-coding the candidate corrections for the most common spelling errors with ambiguous corrections will yield a spelling correction system that seems more accurate to the user because it eliminates the spurious choices. Standard methods of candidate generation may be used to provide an initial list and add missing words and delete spurious words from the list, as well as fixing the order of the words in the list. The user's own manual corrections to the text of the document may be used to generate correction rules.

The present invention uses patterns that match not just the actual error, but sufficient context to provide certainty that the potential error is indeed an error. This permits the present invention to unambiguously determine the correct alternative so that the rules may execute automatically as the user types. The present invention also allows other attributes and constraints in addition to whole words and parts of speech, such as case restrictions, the existence of sentence and phrase final punctuation, space deletion for multiple-word rules and a list of exceptions for each rule. The exceptions may be specified as regular expressions and as whole words.

This makes the present invention more powerful and compact than other spelling correction systems. For example, only 30 rules are necessary to correct the differences between British and American spelling conventions. This requires significantly less space and executes much faster than a system which lists all of the more than 8,000 word pairs.

The invention described herein has been implemented in LISP source code. The entire program listing has been included in the microfiche appendix. LISP is a well-known language which is described, for example, in *LISP Second Edition* by Patrick Henry Winston and Berthold Klaus Paul Horn, Addison-Wesley Publishing Company (1984). The source code includes over 850 lines of code, over 550 lines of regular expression rules and over 20,000 lines of single and multiple word rules. What follows is a brief guide to the major functions that execute corrections including a short explanation followed by the actual LISP code.

AUTOCORRECT is a function that grabs a copy of the immediately preceding words and passes them to the correction code. The correction code will return new corrected words if the preceding words need to be corrected. If so, AUTOCORRECT substitutes the new words for the original words in the text.

```
(defun autocorrect (&optional char)
    ;; This function grabs the word and passes it to the
correction code.
    ;; If the correction code changes the word, it
substitutes the new word.
    (interactive)
    (if autocorrect-mode
                    (if (and *undid-correction* (not
*allow-redo-of-undos*))
        (setq *undid-correction* nil)
        (let ((position (point)))
            ;; Reset the flag to indicate that no correction has
been made.
            (setq *made-correction* nil)
            ;; The call to word-end must be before the call to
word-start.
            ;; We set END to the minimum of the position and
word-end to
            ;; have it work correctly if you type a space inside
a word.
            (let* ((end (min position (word-end)))
                   (start (word-start))
                   (word (bufstring start end))
                   (prev-end (prev-word-end))
                   (prev-start (prev-word-start))
                   (prev (bufstring prev-start prev-end))
                   (replacement nil)
                   (prev-replacement nil)
                   tmp)
            ;; The purpose of this is to have a quick response
time when
            ;; all we're doing is hitting the spacebar to tab
over. We only
            ;; want to do the corrections when we hit the
spacebar within
            ;; or near the end of a word.
            (if (space-situation position end)
            (setq replacement nil)
                (setq replacement (corrected-replacement word
prev)))
            ;; (setq replacement (verifier word))
            (if (consp replacement)
                (progn
                    (setq tmp replacement)
                    (setq replacement (car tmp))
                    (setq prev-replacement (car (cdr tmp)))))
                ;; (setq replacement (verifier replacement))
                (if replacement
                    (setq position
                        (replace-region start end replacement
                                        position t
                                        (string-equal word
replacement))))
                    (if prev-replacement
                        (setq position
                            (replace-region prev-start prev-end
                                            prev-replacement
                                            position nil
                                            (string-equal prev
prev-replacement))))
            (if (or replacement prev-replacement)
                (setq *made-correction* t)))
        (goto-char position))))
    (if (and char (char-equal char 10))
        (insert-char 10 1)
        (self-insert-command 1)) ; (insert " ")
    (if *highlight-corrections*
        (unhighlight-region (- (point) 1) (point)))
    )
.
```

CORRECTED-REPLACEMENT. This function is called by AUTOCORRECT to attempt a correction. First, it looks for case errors, such as those that might result from a failure to release the CAPSLOCK key (e.g., typing "tHIS" instead of "This"). It then corrects single-word errors resulting from slang usage, British English usage, multi-word errors and common spelling errors. Finally, it applies the spelling correction rules.

The following variables contain the indicated rules:

| | |
|---|---|
| slang-corrections | Slang |
| uk-vs-us | British Spelling |
| multi word-corrections | Multiple Word Errors |
| autocorrections | Common Spelling Errors |

-continued

| | |
|---|---|
| missing-spaces | Word Boundary Errors |
| spell-rules | Regular Expression Rules |
| uk-vs-us-rules | Regular Expression Rules for British Spelling |

The last two variables are of the greatest interest. The CORRECT-REPLACEMENT code follows:

```
(defun corrected-replacement (word &optional prev)
    ;; This function does the actual correction.
    (let ((replacement word)
          (prev-replacement nil)
          (original-case (original-case word))
          (original-case-prev (if prev (original-case prev)))
          corrected-case)
        (if *fix-case*
            (progn
                (let ((result (fix-capslock word fixed-prev-capslock)))
                    (if result
                        (progn
                            (setq fixed-prev-capslock t)
                            (setq corrected-case result))
                        (setq fixed-prev-capslock nil)))
                (let ((result (fix-case-errors word)))
                    (if result (setq corrected-case result)))))
        ;; The canonical rule order should be:
        ;; Slang, British, Multi word, Single Word, Rules
        ;; Slang
        (if *correct-slang*
            (setq replacement (or (autocorrect-word* replacement slang-corrections)
                                  replacement)))
        ;; British Spelling
        (if *correct-british-spelling*
            (setq replacement
                  (or (autocorrect-word* replacement uk-vs-us)
                      replacement)))
        ;; Fix Multiple Word Errors
        (let ((tmp (correct-multi word replacement prev multi word-corrections)))
            (if tmp
                (progn
                    (setq replacement (or (car tmp) replacement))
                    (setq prev-replacement (car (cdr tmp))))))
        ;; Single Word
        (setq replacement
              (or (autocorrect-word* replacement
                                     (find-correction replacement autocorrections))
                  replacement))
        ;; Spelling Rules
        (setq replacement (execute-spell-rules* replacement spell-rules))
        ;; British Spelling Rules
        (if *correct-british-spelling*
            (setq replacement (execute-spell-rules* replacement uk-vs-us-rules)))
        ;; Single word correction again.
        (setq replacement
              (or (autocorrect-word* replacement
                                     (find-correction replacement autocorrections))
                  replacement))
        ;; Single British Correction Again
        (if *correct-british-spelling*
            (setq replacement
                  (or (autocorrect-word* replacement uk-vs-us)
                      replacement)))
        ;; Fix Multiple Word Errors Again
        (let ((tmp (correct-multi word replacement (or prev-replacement prev)
                                  multi word-corrections)))
            (if tmp
                (progn
                    (setq replacement (or (car tmp) replacement))
                    (setq prev-replacement (or (car (cdr tmp)) prev-replacement)))))
```

```
-continued

;; Fix Missing Spaces
(setq replacement (or (autocorrect-word* replacement missing-spaces)
                            replacement))
;; Fix Name Case
(if *fix-case*
    (setq replacement (or (casecorrect-word replacement case-corrections)
                                replacement)))
(if piglatin-mode
    (setq replacement (piglatin replacement)))
(if replacement
    (setq replacement (correct-case word replacement (or corrected-case
                                                original-case))))
(if prev-replacement
    (setq prev-replacement
                    (correct-case prev prev-replacement original-case-prev)))
(if (string-equal replacement word)
    (setq replacement nil))
;; Return results
(if prev-replacement
    (list replacement prev-replacement)
    replacement)))
```

AUTOCORRECT-WORD is used to correct single word errors, such as slang, British spelling and common spelling errors. These rules are simple word-for-word substitutions. As we generate regular expression rules, we delete the word-for-word substitutions that match the regular expression rules. The AUTOCORRECT-WORD code follows:

```
(defun autocorrect-word* (word corrections)
   (let ((result (autocorrect-word word corrections)))
       (if (or (not result) (string-equal result word))
           result
           (or (autocorrect-word result corrections)
               result))))
(defun autocorrect-word (word corrections)
   (let (pair
       left right tmp
       found case-sensitive)
       (while (and corrections (not found))
           (setq pair (car corrections)
               corrections (cdr corrections))
           (setq left (car pair)
               right (car (cdr pair))
               case-sensitive (car (cdr (cdr pair)))))
           ;; test was (string-equal-ci left word)
           (if (if case-sensitive
                   (string-equal left word)
                   (string-equal-ci left word))
               (setq found right)))
       found))
```

CORRECT-MULTIWORD is used to correct multiple word errors. It iterates over the list of rules, looking for rules that match the current and previous word. If there is a match, it applies the rule to correct either or both words (as indicated by the rule). The format of the rules is as follows: ((ptest wtest regexp-test exceptions) (prepl wrepl delspace) case-sensitv); "ptest" and "wtest" are tests applied to the previous and current word; "regexp-test" is a boolean that specifies whether ptest and wtest are compared using simple string equality or using a regular expression match. (If nil, string-equal is used; if T, regular-expression match function string-match is used.) "string-equal" is provided since some rules do not require the full complexity of regular-expression match. "exceptions" is a list of exceptions to "wtest". The exceptions are always compared using a regular expression match. "prepl" and "wrepl" are strings used to replace the previous and current word. If specified as "", the word is deleted. If specified as nil, the word is left alone. "delspace" is a boolean that indicates whether the space between the previous and current words should be deleted. "case-sensitv" is a boolean that indicates whether the rules are case sensitive or case insensitive. Here are examples of actual rules. The first rule shows how a regular expression multi-word rule can be used to perform name completion. Using this rule, typing a first name and the first three (or more) letters of a last name, the rule replaces the latter with a full last name when the spacebar is touched. The ^ symbol in the rule is from a regular expression syntax, and specifies that the letters Kan must be at the beginning of the word. The t indicates a regular expression rule, the ( ) indicates no exceptions. The nil indicates that the space between the first and last names is retained:

(("Mark" "^Kan" t ( )) ("Mark" "Kantrowitz" nil))

A simpler rule can be used to correct errors involving loose/lose.

(("loose" "work") ("lose" "work"))

Similarly, a set of six rules relates to the its/it's distinction.

(("its" "a") ("it's" "a")); 224 examples
(("its" "the") ("it's" "the")); 88 examples
(("its" "an") ("it's" "an")); 24 examples
(("its" "that") ("it's" "that")); 10 examples
(("its" "there") ("it's" "there")); 7 examples
(("its" "here") ("it's" "here")); 2 examples The comments after each rule indicate the number of examples of this error found in a corpus containing about 2,000 uses of its or it's.

For a more complex rule, look at one of the rules for correcting a/an errors:

(("^an$" "^[^a^e^i^o^u^h]" t ("^H$" "^honest$" "^honor" "^hour" "^heir$" "^herb")) ("a" nil))

This rule says that the word "an" followed by a word beginning with a vowel or letter h, except where the word that follows is a single letter or one of a small set of exceptions, is replaced with the word "a". The CORRECT-MULTIWORD code follows:

```
(defun correct-multiword (word prev &optional rules)
    (let ((found nil)
            rule wtest ptest regexp-test exceptions wrepl prepl delspace case-sensitive)
        (if prev
            (while (and rules (not found))
                (setq rule (car rules))
                (setq rules (cdr rules))
                ;; format is
                ;; ((ptest wtest regexp-test exceptions) (prepl wrepl delspace) case-sensitv)
                (setq ptest (car (car rule))
                    wtest (car (cdr (car rule)))
                    regexp-test (car (cdr (cdr (car rule))))
                    exceptions (car (cdr (cdr (cdr (car rule)))))
                    prepl (car (car (cdr rule)))
                    wrepl (car (cdr (car (cdr rule))))
                    delspace (car (cdr (cdr (car (cdr rule)))))
                    case-sensitive (car (cdr (cdr rule))))
                (if (if case-sensitive
                        (and (string-equal word wtest)
                                (string-equal prev ptest))
                        (and (string-equal-ci word wtest)
                                (string-equal-ci prev ptest)))
                    ;; was (not (member word exceptions))
                    (if (not (matches-exception word exceptions regexp-test))
                        (setq found (list wrepl prepl))))
                (if (and regexp-test (not found)
                        (string-match wtest word)
                        (string-match ptest prev))
                    ;; was (not (member word exceptions))
                    (if (not (matches-exception word exceptions regexp-test))
                        (setq found (list wrepl prepl))))
                (if (and found delspace)
                    (setq found (list " "
                            (format "%s%s"
                                (or (car (cdr found)) ; prepl
                                    prev)
                                (or (car found) ; wrepl
                                    word)))))
            ))
        found))
```

EXECUTE-SPELL-RULES function is used to apply the regular expression rules. The format of the rules is as follows: (constraint exceptions offset width substitution case) "constraint" is a regular expression that matches the word. "exceptions" is a list of regular expressions that should match any exceptions to the rule. "offset" and "width" specify the portion of the word to be deleted, if any. (Width would be 0 if no text were to be deleted. If the entire word were to be deleted, width would equal the word's length.) "substitution" is a string that is inserted at the position indicated by offset. "offset", incidentally, is relative to the first position where constraint matches the word, not the beginning of the word. For example, here is a rule that corrects one of the more common s/z replacement errors that occur with British spelling:

("[aeiouy][dmnrtl]ising" ("^arising$" "^demising$" "pr[oe]mising") 3 1 "z")

The constraint looks for a vowel or y followed by one of the consonants dmnrtl, followed by the string "ising". Note that we do not include the end-of-word symbol $ after "ising", so this rule should also match words that end in "isingly" or other characters beyond "ising". The exceptions list rules out four exceptions to this rule. Since we are using 0-based indexing, the 3 indicates an offset to the letter "s". The 1 indicates one character to be deleted (the s), and a "z" is substituted.

Other example rules include:

("mnet$" ( ) 0 4 "ment")

("toin" ("dittoing" "vetoing") 0 4 "tion")

These correct common suffix transpositions. The rule ("oualy" ( ) 0 3 "ous") corrects a/s substitution errors when followed by the -ly suffix (this kind of substitution error is much more common in that context). The rule ("blity" ( ) 0 5 "bility") is an example of correcting a deletion error, and ("[cdfhklmnprsvwxz]eing$" ("chasseing") 1 4 "ing") corrects a common spelling error (forgetting to delete the silent e when adding the suffix "ing"). We can also stick in the u that follows q if the user forgets it ("^q[^u]" ("^q[aeio]u" "q's" "qwerty" "qabbala" "qadi" "^qatar$" "^qat$") 0 1 "qu")

A rule to correct common semicolon-apostrophe substitution errors (e.g., "I;d" instead of "I'd") reads, (";d$" ("http;") 0 1 "'")

The "i before e except after c" rule has many more exceptions than targeted in school (e.g., science, society, words ending in -cied, -cier, etc.):

("cie" ("scien[ct]" "societ" "ancient" "hacienda" "cie$" "cie[drs]" "ciety" "cien[ct]") 0 3 "cie")

Additional rules correct for ei/ie transposition errors, such as ("[^c]eiv" ( ) 1 2 "ie"); believe, mischievous (Here [^c] means not c.)

Rules for f/v replacement should probably be restricted according to part of speech, since knife+s becomes knives when knife is a noun, but knifes when knife is a verb. To do so would require integrated part-of-speech tagging as part of this system. We implemented such rules using multi-word rules (e.g., knife preceded by "the" is a noun) without part-of-speech tagging.

Rules to handle missing space errors, such as the omission of space after a close-parenthesis, may include:

(") [a–z] " ( ) 1 0 " ")

The EXECUTE-SPELL-RULES code follows:

```
(defun execute-spell-rules* (word &optional rules)
    (let ((result (execute-spell-rules word rules)))
        (if (or (not result) (string-equal result word))
        result
            (or (execute-spell-rules word rules)
            result))))
(defun execute-spell-rules (word &optional rules)
    (let (rule
        constraint exceptions offset width substitution case
        result)
      (while rules
        (setq rule (car rules))
        (setq rules (cdr rules))
        (setq constraint (car rule))
        (setq exceptions (car (cdr rule)))
        (setq offset (car (cdr (cdr rule))))
        (setq width (car (cdr (cdr (cdr rule)))))
        (setq substitution (car (cdr (cdr (cdr (cdr rule))))))
        (setq case (car (cdr (cdr (cdr (cdr (cdr rule)))))))
        (let ((position (string-match constraint word)))
        (if (and position
                (not (matches-exception word exceptions t))
                (or (not case) (string-equal word (downcase word))))
        (progn
        (setq position (+ position offset))
        (let ((leftpart (substring word 0 position))
            (rightpart (substring word (+ position width))))
        (setq result (format "%s%s%s" leftpart substitution rightpart))
        (if result
            (setq word result))
        )))))
    word))
```

As used in the foregoing specification and in the following claims, a "regular expression" comprises an n-gram template to be matched against a string of characters in a word. The n-gram template string may comprise less than all characters in the word. Matching the string either succeeds or fails. A matched pattern may cause addition, deletion and/or substitution of characters in the word. The n-gram template may comprise alternative characters, wild card characters and position indicators.

Having thus defined our invention in the detail and particularity required by the Patent Laws, what is desired protected by Letters Patent is set forth in the following claims.

We claim:

1. A computer implemented method which does not require a stored dictionary for correcting spelling errors in a sequence of words, said method comprising the steps of:
   a) storing a plurality of dictionary pretested for exceptions spelling rules defined as regular expressions for matching potentially illegal n-grams some of which comprise less than all letters in a word and for replacing an illegal n-gram with a legal n-gram to return a corrected word;
   b) submitting a word from said sequence of words to the spelling rules; and
   c) replacing a word in the string of words with a corrected word,
   wherein an exception list is associated with at least one regular expression or with the system as a whole to prevent n-gram replacement where the word matches an exception to the rule.

2. A computer implemented method which does not require a stored dictionary for correcting spelling errors and adjacent word grammar errors in a sequence of words, said method comprising the steps of:
   a) storing a plurality of spelling and grammar rules pretested for exceptions defined as regular expressions for matching potentially illegal n-grams some of which comprise less than all letters in a word and given the context of one or more adjacent words replacing an illegal n-gram with a legal n-gram to return a corrected word;
   b) submitting at least two adjacent words at a time from said sequence of words to said rules; and
   c) replacing a word in the sequence of words with a corrected word,
   wherein an exception list is associated with at least one regular expression or with the system as a whole to prevent n-gram replacement where the word matches an exception to the rule.

3. The method according to claim 1 or 2, comprising storing spelling rules which match potentially illegal n-grams comprising two or more characters.

4. The method according to claim 1 or 2, comprising storing spelling rules that recognize and correct complex types of errors in addition to simple insertions, deletions, substitutions and transpositions.

5. The method according to claim 1 or 2 that automatically corrects errors as the user types.

6. The method according to claim 1 or 2 that batch process corrects errors.

7. The method according to claim 1 or 2, that corrects a text file input by an optical character reader.

8. The method according to claim 1 or 2, that recognizes error in a text file input from an automatic handwriting recognition system.

9. The method according to claim 1, wherein the spelling rules use multiple words in context to identify spelling errors, confusable words and common grammar errors.

10. The method according to claim 1, wherein the spelling rules use multiple words in context to identify a unique correction from more than one possible correction.

11. The method according to claim 1, wherein the spelling rules use multiple words in context to correct word boundary errors.

12. The method according to claim 12, wherein the word boundary errors are selected from the group comprising missing spaces, inserted spaces, shifted spaces and combinations thereof.

13. The method according to claim 9, 10 or 11, wherein the context words are defined by regular expressions.

14. The method according to claim 1 or 2, wherein the rules include constraints based on case restrictions.

15. The method according to claim 1 or 2, wherein the rules include constraints based upon parts of speech.

16. The method according to claim 1 or 2, wherein the rules include constraints based on capitalization and/or punctuation appearing within the sequence of words.

17. The method according to claim 7, wherein letter confusion matrices are used to generate potential rules.

18. The method according to claim 1 or 2, wherein a corrected word is submitted to at least one additional rule.

19. A method which does not require a stored dictionary for correcting spelling errors in a sequence of words comprising the steps, some of which are implemented by a programmed computer, of:

a) generating spelling rules defined as regular expressions for matching illegal n-grams some of which comprise less than all letters in a word and for replacing an illegal n-gram with a legal n-gram to return a corrected word, said step of generating spelling rules comprising selecting as templates letters from errors in an error corpus and one or more letters of context to identify a set of rules pretesting and pruning from the set of rules those that are too general, too specific or do not identify the cause of the error;

b) storing said set of spelling rules defined as regular expressions;

c) submitting a word from said sequence of words to the spelling rules; and     d) replacing a word in the sequence of words with a corrected word.

20. The method according to claim 19, wherein new rules are generated based upon the user's manual corrections.

21. The method according to claim 1 or 2, wherein the rules are stored in any one of hash tables, tries, linear lists and finite state automata.

* * * * *